J. P. CRANDALL.
FILLING MACHINE.
APPLICATION FILED NOV. 22, 1910.

1,108,974.

Patented Sept. 1, 1914.

WITNESSES:
Walter H. Kelly
Othel A. Kelly

INVENTOR
John P. Crandall
By J. Wm Ellis
ATTORNEY

THE NORRIS PETERS CO., PHOTO-LITHO., WASHINGTON, D. C.

UNITED STATES PATENT OFFICE.

JOHN P. CRANDALL, OF BUFFALO, NEW YORK.

FILLING-MACHINE.

1,108,974.  Specification of Letters Patent.  Patented Sept. 1, 1914.

Application filed November 22, 1910. Serial No. 593,647.

*To all whom it may concern:*

Be it known that I, JOHN P. CRANDALL, a citizen of the United States of America, residing at Buffalo, in the county of Erie and State of New York, have invented certain new and useful Improvements in Filling-Machines, of which the following is a full, clear, and exact description.

The main objects of my invention have been: to provide a device which shall accurately weigh the amount of liquid put in each receptacle and which shall automatically shut off the supply when any predetermined amount of liquid has been discharged from the machine; to entirely incase all parts which come in contact with the liquid being handled and thus prevent gumming and sticking of the valves due to evaporation; to provide a machine which shall be very easy to operate, even by unskilled operators; to provide a device which shall be easy and cheap to manufacture; and to provide a machine which shall operate under high or low pressure of the liquid with uniform results.

Figure 1:
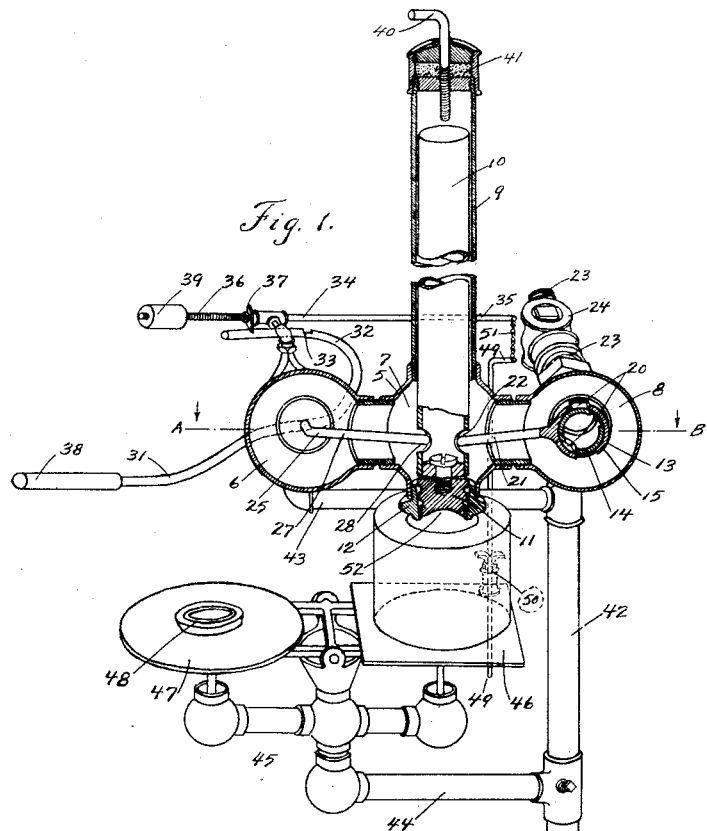
Figure 2:
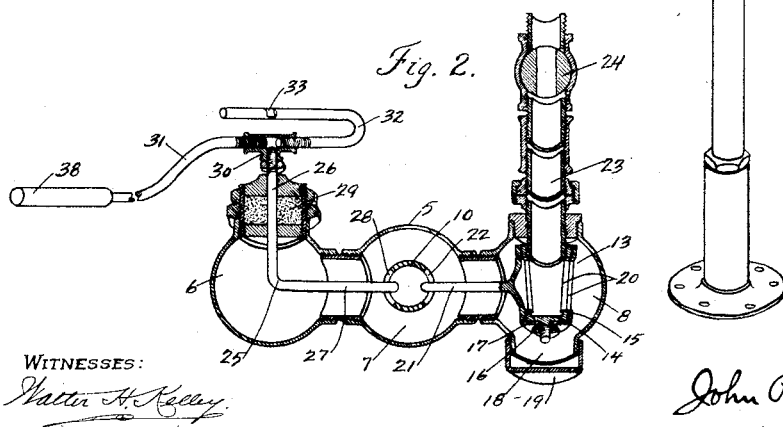

Reference is to be had to the accompanying drawings, forming part of this specification, in which similar characters of reference indicate similar parts throughout the several views of which:

Figure 1 is a sectional elevation of my machine in perspective. Fig. 2 is a sectional view taken on the line A—B of Fig. 1.

5 is the casing of my device which may be made in one piece or built up of parts 6, 7 and 8 suitably secured together. Screw-threaded into an aperture in the top of the casing 5 is a tube 9. This tube projects vertically above the casing and has loosely disposed therein a hollow valve stem 10, which is closed at its upper end. The upper end of the said tube is closed and is provided with an adjustable abutment 40 which passes through a stuffing box 41. This screw limits the upward travel of the stem 10. At the lower end of the said stem is loosely mounted a plug valve 11. Into the casing 5 and directly beneath the tube 9 is screwed a valve seat member 12 into which the plug valve 11 is arranged to fit, thereby forming the discharge valve 52 of my device. The valve stem 10 guides the plug valve 11 to its seat and also acts as a counterweight to overcome resistance and friction of the working parts of the machine and thus insures the automatic closing of the valves when the machine is in operation as will be hereinafter described.

Within the part 8 of the casing 5 is disposed the inlet valve 13, comprising a stationary hollow tapered plug 14, suitably carried in a horizontal position by the casing 5, and a rotatable plug seat 15 rotatably mounted upon the plug 14. The said plug and plug seat are each provided with a plurality of lateral slots 20, which are arranged to register at a certain point during the operation of the machine and through which the fluid is admitted. A nut 16 and washer 17 are placed upon the end of the plug 14 by which the plug seat 15 is kept in place and adjusted. The casing at a point opposite the end of this plug is provided with an aperture 18 through which the said nut is made accessible. The said aperture is closed by means of the cap 19. Preferably integral with the plug seat 15 is a lever 21 which extends inwardly toward the center of the casing 5 and has its inner end disposed within an opening 22 in one side of the hollow stem 10. Leading into the hollow tapered plug 14 is the liquid supply pipe 23 which is preferably provided with a stop cock 24 by which the supply is cut off when the machine is not in use.

Within the part 6 of the casing 5 is disposed an operating rod 25 which is bent so as to form a right angle. The part 26 of said rod 25 is rotatably disposed in a horizontal position in suitable bearings carried by the casing 5. The part 27 of said rod 25 extends inwardly toward the center of the casing and has its inner end disposed in an opening 28 in the hollow stem 10. A stuffing box 29 is provided through which the part 26 of the said rod passes so as to prevent leakage at this point. To the outer end of the rod part 26 is rigidly secured a T piece 30 in one end of which is fitted an operating lever 31 and in the opposite end of said T piece is carried a segment rod 32 which is curved at its outer end so as to form a segment of a circle, said segment having its center in the part 26 of the rod 25. This segment rod is preferably made of steel and hardened, and is provided in its upper face with a notch 33. The operating lever 31 is provided with a handle 38 which is grasped by the operator when the machine is set to operate. Pivotally supported in any suitable way above the segment rod 32 is a trigger rod 34 provided with a long arm 35 and a short arm 36. Upon the short arm 36 is adjustably carried a trigger member 37 which is engageable with the notch 33 in the segment arm 32. The short arm of the trigger lever is preferably screw-threaded and has adjustably mounted thereon a weight 39. The long arm 35 of the trigger lever is connected to the scale pan by means to be hereinafter described.

42 is a vertical stand which supports the machine. The horizontal supporting member 43 assists in holding the outer end of the machine and the pivotal point for the trigger arm 34. Mounted upon the vertical stand 42, is a horizontal scale support 44, at the outer end of which is carried in any suitable manner a scale which I have represented generally by the numeral 45. For this scale I may use any one of the numerous types of balancing scales which are familiar to all skilled in the art and, therefore, need not here be described in detail, except that 46 represents the scale pan of the scale and 47 the weight pan thereof. Upon the scale pan 46 is placed the receptacle to be filled as represented in Fig. 1 and upon the weight pan 47 is placed the weight 48. This weight is equivalent to the weight of the amount of liquid to be placed within the can plus the weight of the can and the weight of the parts of the machine carried by this scale pan. Carried by the scale pan 46 is a vertically disposed trigger rod 49 which is adjustably secured to said scale pan by any suitable means at 50. Connecting the upper end of the rod 49 with the long arm 35 of the trigger 34 is any suitable flexible means, preferably the chain 51.

Having thus described my invention I will now describe its operation.

Before starting to operate the machine, all the parts are in substantially the position shown in Fig. 1. A proper weight 48 is placed upon the weight pan 47 and the receptacle to be filled is placed upon the scale pan 46 with its mouth directly beneath the discharge valve 52. Both the discharge valve 52 and the inlet valve 13 are closed at this time. The operator now presses downwardly upon the handle 38 of the operating lever 31 until the trigger 37 engages the notch 33 in the segment 32. This movement by means of the operating rod 25, raises the valve stem 10 together with the plug valve 11. An instant after the plug valve 11 starts to open, the lever 21 is raised by the upward movement of the valve stem 10 and opens the inlet valve 13, thus allowing the fluid under pressure to enter the casing of the machine and pass out through the discharge valve and into the receptacle placed beneath the same. When the required weight of liquid has been run into the receptacle on the scale pan 46, as indicated by the weight 48 on the weight pan 47, this side of the scale 45 begins to move downwardly. As the scale pan 46 is connected with the long arm 35 of the trigger lever 34, the trigger member 37 will be raised and disengage the notch 33 in the segment 32 as the said scale pan descends. When the trigger member is released the valve stem 10 is allowed to fall by gravity and, by means of the lever 21, first closes the inlet valve 13 and an instant later closes the discharge valve 52 and leaves the machine ready for the next cycle of operation. Thus the supply of liquid is automatically cut off when the required amount of liquid has been discharged and this amount is always uniform each time the machine is operated with the same weight upon the weight pan 47 and with the same liquid. When the supply 13 is shut off by the downward movement of the valve stem 10, the casing is left with only atmospheric pressure within it and therefore with no excess pressure upon the discharge valve 52 and this is true irrespective of the pressure in the supply pipe and this makes it possible to operate the machine under high or low pressure without appreciable variation of results.

In the drawings for convenience I have shown a trip scale but any type of scale may be used with my filling machine with equal efficiency and still be within the scope of the appended claims.

Obviously some modifications as to the details herein shown and described may be made, without departing from the spirit of my invention and I do not wish to be limited to the exact embodiment herein shown and described.

Having thus described my invention what I claim is:

1. In a filling machine the combination with scales, capable of holding a liquid receptacle; of an inclosed casing, a supply valve within said casing, a discharge valve within said casing, means for opening said valves, means for holding said valves open against their normal tendency to close, and means for automatically tripping and thereby closing said valves when a predetermined amount of liquid has been discharged from the machine.

2. In a filling machine the combination with scales, capable of holding a liquid receptacle; of an inclosed casing, a supply valve within said casing, a discharge valve within said casing, manual means for opening first one of said valves and then the other in the reverse of the order above named, means for holding said valves open against their normal tendency to close, and automatic means for tripping and thereby closing said valves in the order named when a predetermined amount of liquid has been discharged from said machine.

3. In a filling machine the combination with scales, capable of holding a liquid receptacle; of an inclosed casing, a supply valve within said casing, a discharge valve within said casing, manual means for opening first one of said valves and then the other in the reverse of the order above named, means for holding said valves open against their normal tendency to close, and means connecting said valves and said scales, whereby said valves may be automatically tripped and thereby closed in the order above named when a predetermined amount of liquid has been discharged from said machine.

4. In a filling machine the combination with scales, capable of holding a liquid receptacle; of an inclosed casing, a discharge valve disposed within and at the bottom of said casing, a closed tube rising vertically from said casing above said discharge valve, a discharge valve stem slidably mounted in said tube and said casing, a supply valve mounted within said casing and connected with a suitable supply of liquid, manual means for opening said discharge valve and said supply valve in the order named, means for holding said valves open against their normal tendency to close, and automatic means for tripping and thereby closing said valves in the reverse of the order above named when a predetermined amount of liquid has been discharged from said machine.

5. In a filling machine the combination with scales, capable of holding a liquid receptacle; of an inclosed casing, a discharge valve disposed within and at the bottom of said casing, a closed tube rising vertically from said casing above said discharge valve, a discharge valve stem slidably mounted in said tube and said casing, a supply valve comprising a hollow tapered plug carried by said casing and connected with a suitable supply of liquid, a valve seat member rotatably mounted upon said plug, said supply valve plug and seat each being provided with lateral slots, manual means for opening said discharge valve and said supply valve in the order named, means for holding said valves open against their normal tendency to close, and automatic means for tripping and thereby closing said valves in the reverse of the order above named when a predetermined amount of liquid has been discharged from said machine.

6. In a filling machine the combination with scales, capable of holding a liquid receptable; of an inclosed casing, a discharge valve mounted within said casing comprising a valve seat member secured to the bottion of said casing, tapered valve plug fitting into said valve seat, a closed tube rising vertically from said casing, a discharge valve stem slidably disposed within said casing and said tube and loosely connected to said discharge valve plug, a supply valve comprising a hollow tapered plug carried by said casing and connected with a suitable supply of liquid, a valve seat member rotatably mounted upon said plug, said supply valve plug and seat each being provided with lateral slots, manual means for opening said discharge valve and said supply valve in the order named, means for holding said valves open against their normal tendency to close, and automatic means for tripping and thereby closing said valves in the reverse of the order above named when a predetermined amount of liquid has been discharged from said machine.

7. In a filling machine the combination with scales, capable of holding a liquid receptable; of an inclosed casing; a discharge valve mounted within said casing comprising a valve seat member secured to the bottom of said casing, a tapered valve plug fitting into said valve seat, a closed tube rising vertically from said casing, a discharge valve stem slidably disposed within said casing and said tube and loosely connected to said discharge valve plug, a supply valve comprising a hollow tapered plug carried by said casing and connected with a suitable supply of liquid, a valve seat member rotatably mounted upon said plug, said supply valve plug and seat each being provided with lateral slots, a supply valve lever secured to said valve seat member and loosely connected to said discharge valve stem, an operating rod disposed within said chamber and loosely connected to said valve stem, manually operated means connecting said rod, outside of said casing, for operating said valves, trigger means engageable with said manually operated means for holding said valve open and means connecting said trigger means with said scales whereby said valves may be automatically tripped and thereby closed when a predetermined amount of liquid has been discharged from said machine.

8. In a filling machine the combination with scales, capable of holding a liquid receptable; of an inclosed casing, a discharge valve mounted within said casing, a tube extending vertically above said casing, a valve stem slidably disposed within said casing and said tube, a supply valve comprising a stationary plug carried by said casing and a rotatable valve seat member, a supply valve lever connecting said valve seat member with said valve stem, a right-angled operating rod rotatably disposed in said casing having its inner end loosely connected to said valve stem, manually operated means secured to the outside end of said operating rod, a segment rod secured to said operating rod and provided with a notch, a trigger arm pivotally supported above said segment rod, a trigger carried by said trigger arm and engageable with said notch, a vertically adjustable rod carried by the scale pan on which a receptacle is placed and flexible means connecting said vertical rod with said trigger arm, whereby the said valves may be automatically tripped and thereby closed when a predetermined amount of liquid has been discharged from said machine.

In testimony whereof I have hereunto set my hand in the presence of two witnesses.

JOHN P. CRANDALL.

Witnesses:
ETHEL A. KELLY,
J. WM. ELLIS.

Copies of this patent may be obtained for five cents each, by addressing the "Commissioner of Patents, Washington, D. C."